United States Patent [19]

Gordon

[11] Patent Number: 4,885,745
[45] Date of Patent: Dec. 5, 1989

[54] ALGORITHM FOR MINIMIZING EXCURSION IN PLACEMENT OF CHANNEL SELECTS INTO MULTIPLEXER FRAME

[75] Inventor: David P. Gordon, Stamford, Conn.
[73] Assignee: General DataComm, Inc., Middlebury, Conn.
[21] Appl. No.: 259,855
[22] Filed: Oct. 19, 1988
[51] Int. Cl.$^4$ ............................................. H04J 3/12
[52] U.S. Cl. ................................. 370/110.1; 379/112
[58] Field of Search ................. 370/85, 60, 94, 58, 370/110.1; 340/825.5; 379/112, 162

[56] References Cited

U.S. PATENT DOCUMENTS

| | | | |
|---|---|---|---|
| 4,410,765 | 10/1983 | Hestad et al. | 379/112 |
| 4,585,904 | 4/1986 | Mincone et al. | 379/112 |
| 4,607,144 | 8/1986 | Carmon et al. | 379/162 |
| 4,727,536 | 2/1988 | Reeves et al. | 370/84 |

Primary Examiner—Joseph A. Orsino
Assistant Examiner—Frank M. Scutch, III
Attorney, Agent, or Firm—David P. Gordon

[57] ABSTRACT

An algorithm for ordering selects for a plurality of channels to be multiplexed into a frame is provided. The channel select position counter for each of the channels to be multiplexed are initialized. The first and succeeding channel selects are chosen based on the lowest price (highest cost) ready channel, with the price of a channel being equal to the value of the channel select position counter divided by the number of selects for that channel in the frame, and the readiness of the channel being indicated either by an indicator, or by the relative value of the position counter to the initial value of the position counter. Where channel prices are equal, the select is chosen on the secondary basis of channel rate, with the highest rate channel contributing first. After a select is made, the position counter of the selected channel is increased by the total number of selects in the frame. Then, the position counters of all of the channels, including the selected channel are decremented by a value corresponding to the number of selects for that channel in the frame. After such updating, another selection for the frame may be made based on the lowest priced ready channel. The provided algorithm guarantees that no channel will ever have an excursion of more than one bit available for placement in the frame.

20 Claims, 30 Drawing Sheets

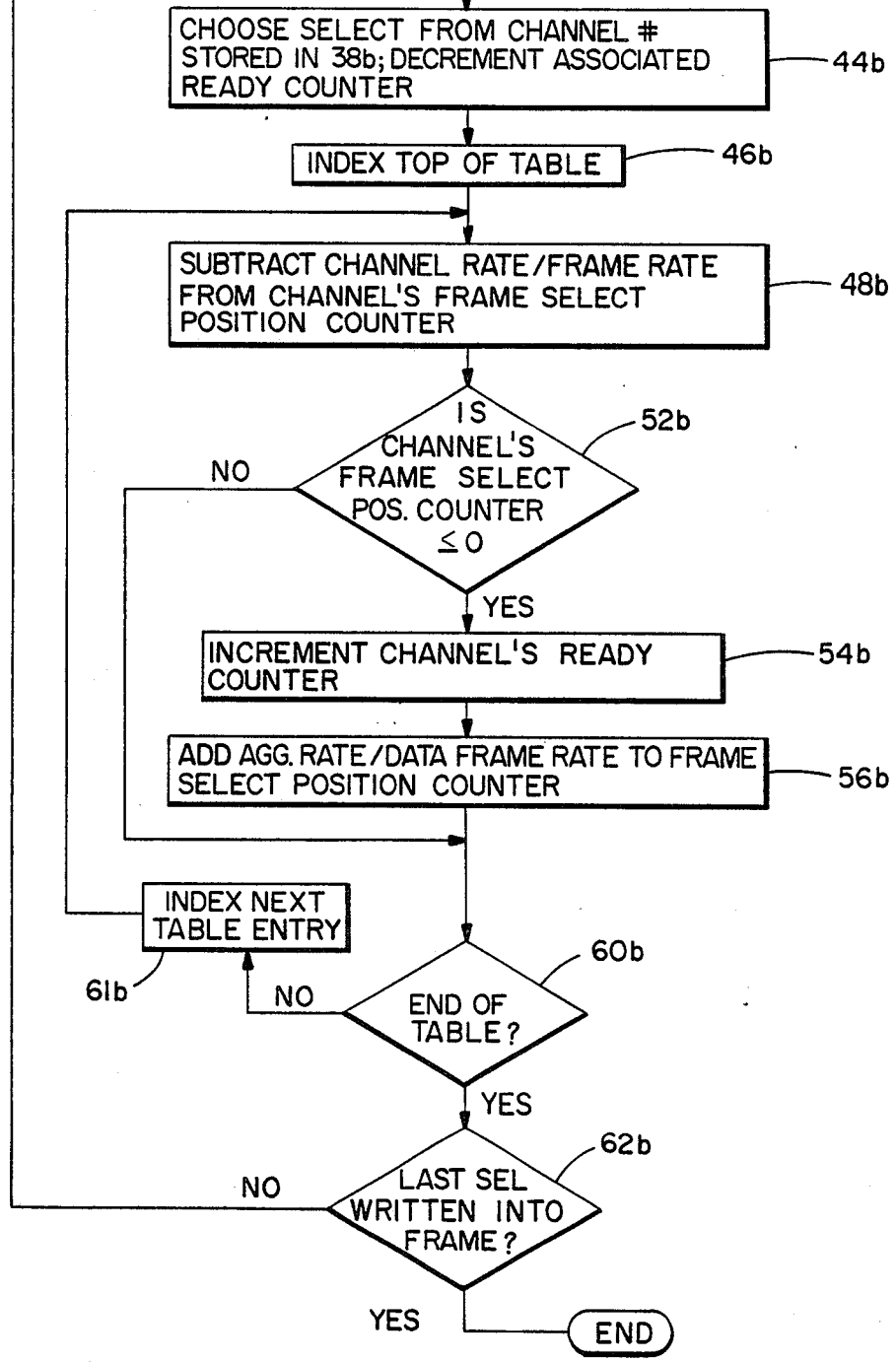

FIG. 2a1

Frame Selects as Generated

FIG. 2a2

Frame length = 240
Number of Channels = 9

| Channel Number | Selects | Ready Ctr Max | Ready Ctr Min |
|---|---|---|---|
| 5 | 78 | 1 | 0 |
| 4 | 45 | 1 | 0 |
| 3 | 23 | 1 | 0 |
| 1 | 23 | 1 | 0 |
| 2 | 23 | 1 | 0 |
| 6 | 12 | 1 | 0 |
| 7 | 12 | 1 | 0 |
| 8 | 12 | 1 | 0 |
| 9 | 12 | 1 | 0 |

| Channel Number | Frame Selects | Position Counter | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 240 | 195 | 150 | 105 | 60 | 15 | 210 | 165 | 120 | 75 |
| 3 | 23 | 240 | 217 | 194 | 171 | 148 | 125 | 102 | 79 | 56 | 33 |
| 1 | 23 | 240 | 217 | 194 | 171 | 148 | 125 | 102 | 79 | 56 | 33 |
| 2 | 23 | 240 | 217 | 194 | 171 | 148 | 125 | 102 | 79 | 56 | 33 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |
| 5 | 78 | 180 | 102 | 24 | 186 | 108 | 30 | 192 | 114 | 36 | 198 |
| 4 | 45 | 30 | 225 | 180 | 135 | 90 | 45 | 240 | 195 | 150 | 105 |
| 3 | 23 | 10 | 227 | 204 | 181 | 158 | 135 | 112 | 89 | 66 | 43 |
| 1 | 23 | 10 | 227 | 204 | 181 | 158 | 135 | 112 | 89 | 66 | 43 |
| 2 | 23 | 10 | 227 | 204 | 181 | 158 | 135 | 112 | 89 | 66 | 43 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 120 | 42 | 204 | 126 | 48 | 210 | 132 | 54 | 216 | 138 |
| 4 | 45 | 60 | 15 | 210 | 165 | 120 | 75 | 30 | 225 | 180 | 135 |
| 3 | 23 | 100 | 77 | 54 | 31 | 8 | 225 | 202 | 179 | 156 | 133 |
| 1 | 23 | 100 | 77 | 54 | 31 | 8 | 225 | 202 | 179 | 156 | 133 |
| 2 | 23 | 100 | 77 | 54 | 31 | 8 | 225 | 202 | 179 | 156 | 133 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 60 | 222 | 144 | 66 | 228 | 150 | 72 | 234 | 156 | 78 |
| 4 | 45 | 90 | 45 | 240 | 195 | 150 | 105 | 60 | 15 | 210 | 165 |
| 3 | 23 | 110 | 87 | 64 | 41 | 18 | 235 | 212 | 189 | 166 | 143 |
| 1 | 23 | 110 | 87 | 64 | 41 | 18 | 235 | 212 | 189 | 166 | 143 |
| 2 | 23 | 110 | 87 | 64 | 41 | 18 | 235 | 212 | 189 | 166 | 143 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

Frame Selects as Generated

FIG. 3a2

| Ready Ctr. Max | Ready Ctr. Min |
|---|---|
| 1 | 0 |
| 1 | 0 |
| 1 | 0 |
| 1 | 0 |
| 1 | 0 |
| 1 | 0 |
| 1 | 0 |
| 1 | 0 |
| 3 | 0 |

Frame length = 240
Number of Channels = 9

| Channel Number | Selects |
|---|---|
| 5 | 78 |
| 4 | 45 |
| 3 | 23 |
| 1 | 23 |
| 2 | 23 |
| 6 | 12 |
| 7 | 12 |
| 8 | 12 |
| 9 | 12 |

| Channel Number | Frame Selects | Position Counter | | | | | | | | | |
|---|---|---|---|---|---|---|---|---|---|---|---|
| 5 | 78 | 240 | 162 | 84 |   | 168 | 90 | 12 | 174 | 96 | 18 |
| 4 | 45 | 240 | 195 | 150 | 6 | 60 | 15 | 210 | 165 | 120 | 75 |
| 3 | 23 | 240 | 217 | 194 | 105 | 148 | 125 | 102 | 79 | 56 | 33 |
| 1 | 23 | 240 | 217 | 194 | 171 | 148 | 125 | 102 | 79 | 56 | 33 |
| 2 | 23 | 240 | 217 | 194 | 171 | 148 | 125 | 102 | 79 | 56 | 33 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |
| 5 | 78 | 180 | 102 | 24 |   | 108 | 30 | 192 | 114 | 36 | 198 |
| 4 | 45 | 30 | 225 | 180 | 186 | 90 | 45 | 240 | 195 | 150 | 105 |
| 3 | 23 | 10 | 227 | 204 | 135 | 158 | 135 | 112 | 89 | 66 | 43 |
| 1 | 23 | 10 | 227 | 204 | 181 | 158 | 135 | 112 | 89 | 66 | 43 |
| 2 | 23 | 10 | 227 | 204 | 181 | 158 | 135 | 112 | 89 | 66 | 43 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 120 | 42 | 204 | 126 | 48 | 210 | 132 | 54 | 216 | 138 |
| 4 | 45 | 180 | 135 | 90 | 45 | 240 | 195 | 150 | 105 | 60 | 15 |
| 3 | 23 | 60 | 37 | 14 | 231 | 208 | 185 | 162 | 139 | 116 | 93 |
| 1 | 23 | 60 | 37 | 14 | 231 | 208 | 185 | 162 | 139 | 116 | 93 |
| 2 | 23 | 60 | 37 | 14 | 231 | 208 | 185 | 162 | 139 | 116 | 93 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 60 | 222 | 144 | 66 | 228 | 150 | 72 | 234 | 156 | 78 |
| 4 | 45 | 210 | 165 | 120 | 75 | 30 | 225 | 180 | 135 | 90 | 45 |
| 3 | 23 | 70 | 47 | 24 | 1 | 218 | 195 | 172 | 149 | 126 | 103 |
| 1 | 23 | 70 | 47 | 24 | 1 | 218 | 195 | 172 | 149 | 126 | 103 |
| 2 | 23 | 70 | 47 | 24 | 1 | 218 | 195 | 172 | 149 | 126 | 103 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

FIG. 3f

| | | | | | | | | | | | |
|---|---|---|---|---|---|---|---|---|---|---|---|
| 5 | 78 | 240/240 | 162/195 | 84/150 | 6/105 | 168/60 | 90/15 | 12/210 | 174/165 | 96/120 | 18/75 |
| 4 | 45 | 80 | 57 | 34 | 11 | 228 | 205 | 182 | 159 | 136 | 113 |
| 3 | 23 | 80 | 57 | 34 | 11 | 228 | 205 | 182 | 159 | 136 | 113 |
| 1 | 23 | 80 | 57 | 34 | 11 | 228 | 205 | 182 | 159 | 136 | 113 |
| 2 | 12 | 240 | 228 | 216 | 204 | 192 | 180 | 168 | 156 | 144 | 132 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 180/30 | 102/225 | 24/180 | 186/135 | 108/90 | 30/45 | 192/240 | 114/195 | 36/150 | 198/105 |
| 4 | 45 | 90 | 67 | 44 | 21 | 238 | 215 | 192 | 169 | 146 | 123 |
| 3 | 23 | 90 | 67 | 44 | 21 | 238 | 215 | 192 | 169 | 146 | 123 |
| 1 | 23 | 90 | 67 | 44 | 21 | 238 | 215 | 192 | 169 | 146 | 123 |
| 2 | 12 | 120 | 108 | 96 | 84 | 72 | 60 | 48 | 36 | 24 | 12 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

Table 1:

| | | | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 240 | 195 | 150 | 105 | 60 | 15 | 210 | 165 | 120 | 75 |
| 3 | 23 | 160 | 137 | 114 | 91 | 68 | 45 | 22 | 239 | 216 | 193 |
| 1 | 23 | 160 | 137 | 114 | 91 | 68 | 45 | 22 | 239 | 216 | 193 |
| 2 | 23 | 160 | 137 | 114 | 91 | 68 | 45 | 22 | 239 | 216 | 193 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

Table 2:

| | | | | | | | | | | | |
|---|---|---|---|---|---|---|---|---|---|---|---|
| 5 | 78 | 180 | 102 | 24 | 186 | 108 | 30 | 192 | 114 | 36 | 198 |
| 4 | 45 | 30 | 225 | 180 | 135 | 90 | 45 | 240 | 195 | 150 | 105 |
| 3 | 23 | 170 | 147 | 124 | 101 | 78 | 55 | 32 | 9 | 226 | 203 |
| 1 | 23 | 170 | 147 | 124 | 101 | 78 | 55 | 32 | 9 | 226 | 203 |
| 2 | 23 | 170 | 147 | 124 | 101 | 78 | 55 | 32 | 9 | 226 | 203 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

ALGORITHM FOR MINIMIZING EXCURSION IN PLACEMENT OF CHANNEL SELECTS INTO MULTIPLEXER FRAME

BACKGROUND

This application is related to concurrently filed application Ser. No. 07/259,803 entitled "Framing Algorithm for Bit Interleaved Time Division Multiplexer", which is hereby incorporated by reference herein and which is assigned to the assignee herein. This application is also related to concurrently filed application Ser. No. 07/259,856 entitled "Algorithm for Selecting Channels for Multiplexer Frame", which is assigned to the assignee herein.

The present invention relates to time-division-multiplexed (TDM) telecommunication systems. More particularly, the invention relates to methods for inserting channel selects into a frame wherein the excursions of the channels are minimized.

In multiplexing information from various channels of varying speeds, it is necessary to buffer information from each channel as the receiver of the multiplexer can only attend to one channel at a time. Each channel typically has its own buffer, and the input by the channel into the buffer relative to the output of the buffer to the receiver is typically asynchronous. It is clearly important that the buffers do not become empty of full at any instant as the empty or full condition would indicate duplication or loss of data respectively.

As indicated in Ser. No. 07/259,803, a framing algorithm may be utilized to set the frame length as well as the number of selects from each channel into the frame. It is then necessary to create a time sequence table with entries which define the order in which the receiver responds to the channels. Each entry in the table represents one bit (or in byte systems—one byte) time of the receiver. Each "channel" must have at least one entry in the frame (even if the entry represents a subsidiary frame such as a secondary or tertiary frame), and the frame is repeated at a rate which is the greatest common divisor of the channel rates. In general, some channels have a large number of entries in the table while other channels may have only a few or even a single entry. It is then desirable to space the entries for each channel such that they are an equal distance apart; i.e. to minimize the accumulated deviation (excursion) from the ideal space for the channel selects in the frame.

Two methods for limiting excursion are known in the art. A first method, the "priority method" is to order the channels according to their speed and to start with the fastest channel and place the fastest channel selects as closely as possible to their ideal position. Then, the procedure is repeated for the next highest channel. If the ideal select slot is taken by the previous channel, then the nearest vacant slot is sought. The procedure continues until all of the channel selects are placed in the frame. The obvious disadvantage of the "priority method" scheme is that the slower channels are often moved relatively far away from their ideal slots. A further disadvantage is that considerable iterative effort is required to find and fill vacant slots.

A second method for limiting excursion is described in detail in commonly owned U.S. Pat. No. 4,727,536. In that patent, a real time allocation process is described where the channels are arranged in descending order of channel rates and starting with the fastest channel, the channels are scanned to determine whether they are ready to contribute a bit to the aggregate. Initially, all the channels are considered ready to contribute. After its first contribution to the frame, the readiness of a channel is determined by the position of a counter associated with the channel. The counter is initially set equal to the frame length. Then, each time a bit is inserted into the frame from the highest rate channel which is ready, the position counter of each channel is adjusted by subtracting the number of selects for that channel from the count, and the position counter of the contributing channel is adjusted by adding the frame length value to the counter value. When the position counter reaches zero or goes negative, the channel is marked to be ready to contribute. The procedure of choosing the fastest channel which is ready to contribute continues until the frame is complete such that all the channels have contributed their proportional number of bits.

Although the method of U.S. Pat. No. 4,727,536 is non-iterative and hence efficient, it has some drawbacks in terms of excursion. Unwanted excursion occurs because the method prioritises the channels and tends to be more responsive to the faster channels. In the case of a large number of channels, the non-iterative method can introduce significant excursion to low order channels.

SUMMARY OF THE INVENTION

It is therefore an object of the invention to provide an efficient framing algorithm which minimizes channel excursion.

It is a further object of the invention to provide a real-time, efficient framing algorithm which assigns cost (or price) functions to channels and which minimizes cost.

In accord with the objects of the invention, an algorithm for ordering selects for a plurality of channels into a frame is provided. The algorithm requires the initializing of a channel ready indicator and a channel select position counter in each of the channels to be multiplexed. The first and succeeding channel selects are chosen based on which ready channel has the lowest "price" (i.e. highest "cost") with the selection of the lowest price (highest cost) channel thereby minimizing total cost. The "price" of a channel is defined by the value of the channel select position counter divided by the number of selects from that channel to the frame, and the "cost" is the inverse thereof (for simplicity, the discussion hereinafter will refer to price only). After a select is made, the position counters of all of the channels (including the selected channel) are decremented by a value coresponding to the number of selects for that channel in the frame, and the position counter of the selected channel only is increased by the total number of selects in the frame. After such updating, and the recalculating of prices, another selection for the frame may be made based on the relative prices of the ready channels.

Because the price of each channel is not necessarily an integer value such as in copending Ser. No. 07/259,856, but rather is a fraction based on how far (in terms of selects) a particular channel is from receiving another bit, channels of different rates will rarely have equal prices. Where channels have equal prices, either channel may be chosen. However, preferably, the channels are also ordered by rate (i.e. equivalently by the number of selects of the channel in the frame), and where prices are equal, a select is made of the channel having the highest rate. The provided algorithm guarantees minimum excursion such that no channel will ever have more than one bit available for placement in the frame (i.e. zero bits of excursion). The advantage of such a guarantee is the knowledge that in operation, a multiplexer will not cause an overflow of a channel buffer due to a large excursion. In fact, the minimum excursion provided by the algorithm permits the reduction in the size of the channel buffers.

Other objects and advantages of the invention will become evident upon reference to the detailed description in conjunction with the provided figures.

BRIEF DESCRIPTION OF THE DRAWINGS

FIG. 2a1 is a chart of frame selects generated by the preferred method invention;

FIG. 2a2 is a chart of channel parameters of the hypothetical channels from which the selects are generated;

FIGS. 2b-2m are charts of the computations performed in generating a hypothetical frame according to the preferred method invention.

FIG. 3a1 is a chart of frame selects generated according to a prior art technique;

FIG. 3a2 is a chart of channel parameters of the hypothetical channels from which selects are generated; and FIGS. 3b-3m are charts of the computations performed in generating a hypothetical frame according to a prior art technique.

DETAILED DESCRIPTION OF THE PREFERRED EMBODIMENT

Figure 1A:
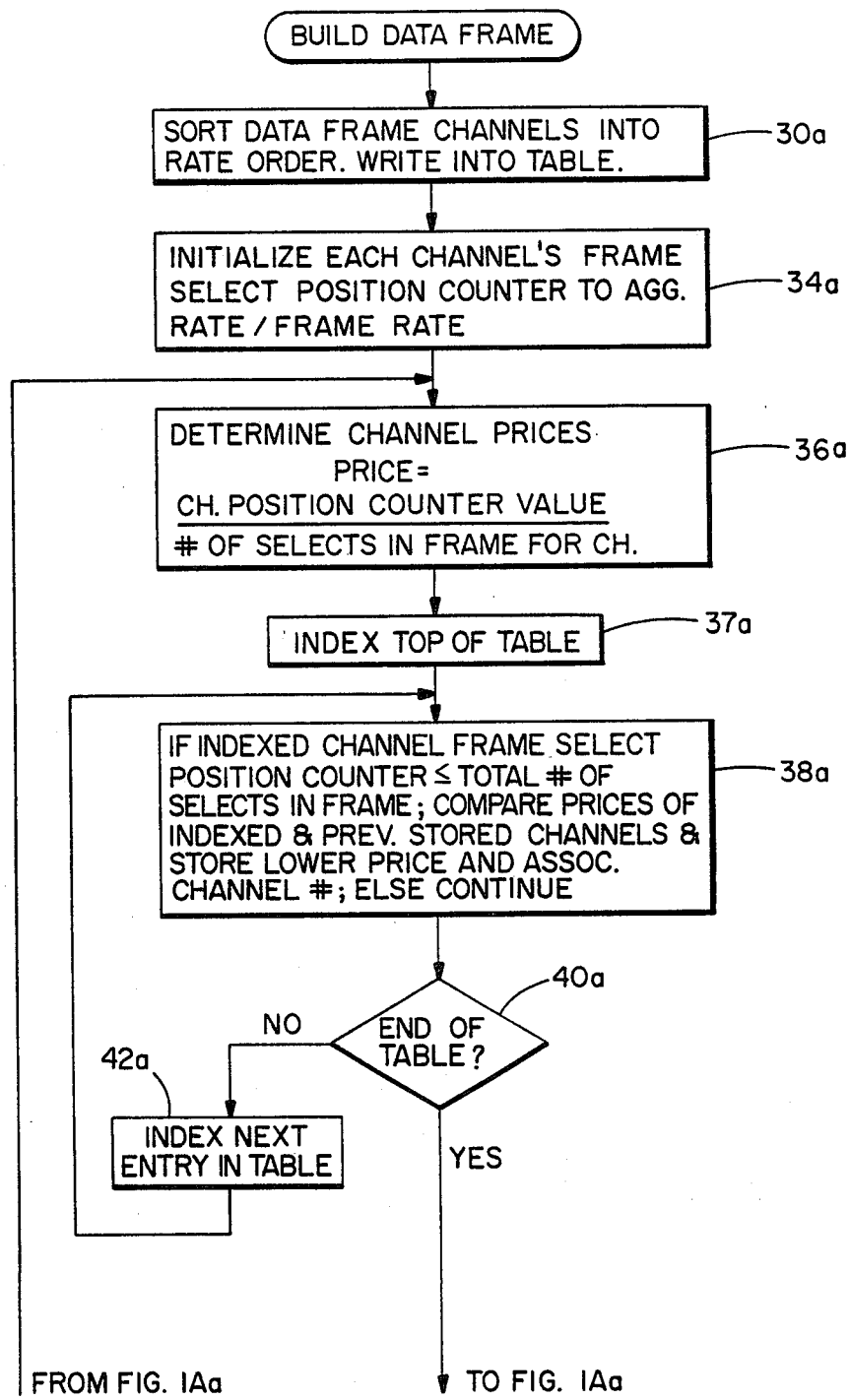
FIG. 1A (including FIG. 1Aa) is a flow chart illustrating the select determination method of the invention.
Figure 1A:
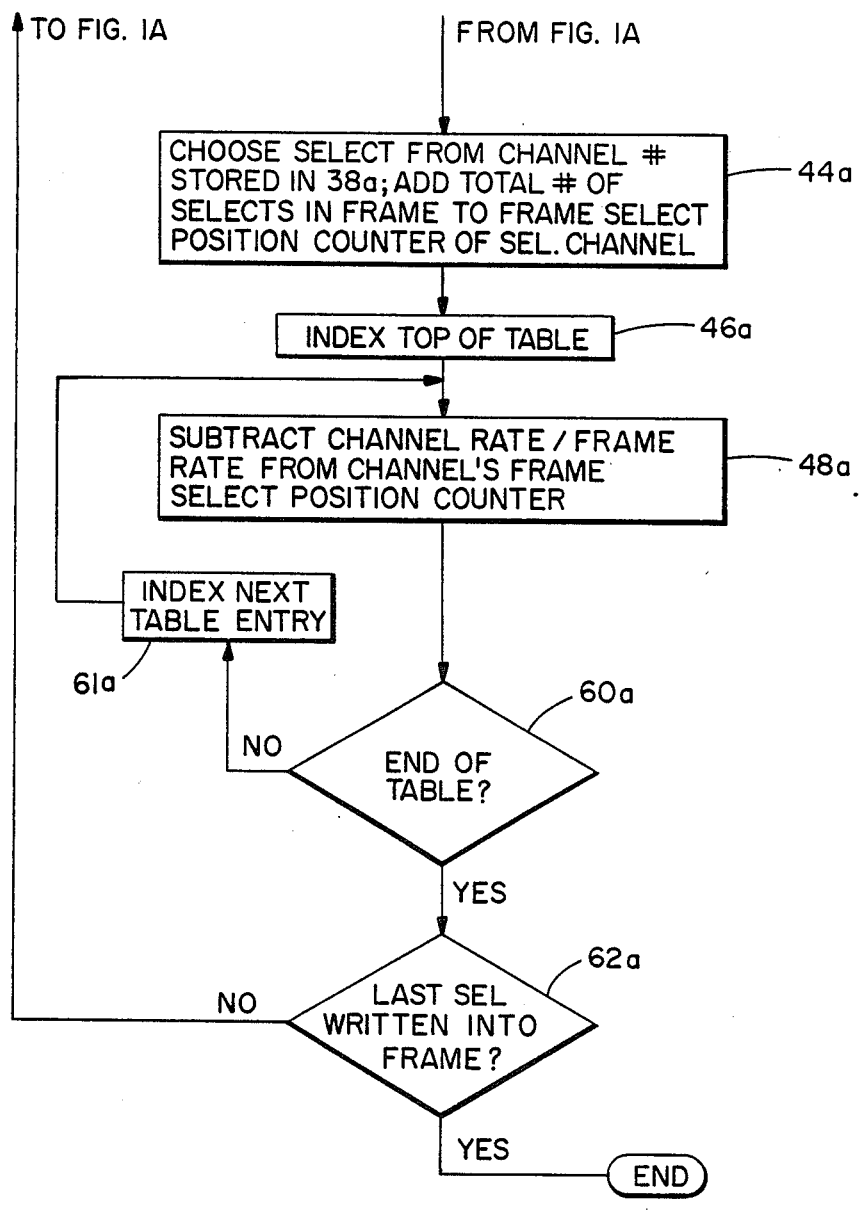

Turning to FIGS. 1A and 1Aa, a flow chart of the preferred method of generating selects for a frame is provided. In the preferred embodiment, at 30a the channels are ordered by rate order (as seen in FIG. 2a1) and a table is generated having as fields: the channel number, the number of selects for the channel in the frame; the channel select position counter; and the channel price. The frame select position counter of each channel is then initialized at 34a (and written into the table) to be equal to the aggregate rate divided by the frame rate. In other words, the position counters of the channels are set to a value equal to the total number of selects in the frame. With the select position counters initialized, at 36a, the prices of the channels are determined (price of channel i=frame select position counter value for channel i divided by the number of selects of channel i in the frame). Then, at 37a, the top of the table (i.e. the first entry—the data channel with the highest rate) is indexed. At 38a, if the channel is ready to contribute a bit (i.e. its select position counter value is less than o equal to the total number of selects in the frame), the price of the indexed channel is compared to the price of the lowest price previously indexed ready channel. If the indexed channel has a lower price than the previously indexed channels, its price is stored along with an indication of channel number. Otherwise, the method continues at 40a with a determination of whether all channels have been scanned. If all channels have not been scanned, the next channel entry is indexed at 42a and if the channel is ready, a price comparison is made at 38a. The loop is continued until all channels have been scanned. Then, at 44a a select is chosen from the channel (as stored in 38a) having the lowest price (i.e. the greatest cost in terms of excursion), and the frame select position counter associated with that channel is incremented by a value equal to the number of selects in the frame. Where a plurality of channels all have the same lowest price, a select is preferably made of the channel having the highest rate. While such a constraint is not necessary to follow the invention, the result naturally follows from the preferred embodiment of steps 30a and 38a where the channels are rate ordered and where the price of a slower ready channel is not stored unless its price is less than that of the previously scanned ready channels.

Once a select has been made and the selected channel's position counter has been incremented, the frame select position counters of all of the channels must be updated. Thus, starting with the highest rate channel addressed at 46a, and in a loop to be described hereinafter, the position counter of each channel is updated. At 48a, a value equal to the number of selects of the particular channel in the frame (which is equal to the channel rate divided by the frame rate), is subtracted from the frame select position counter of the particular channel. Then, a determination is made at 60a as to whether all channels have been updated. If not, the next entry in the table is indexed at 61a and the program returns to step 48a for the current channel being updated. If all channels have been updated, a determination is made at 62a as to whether the frame has been completed. If so, the program ends. If not, the program continues at step 37a where the highest rate channel is indexed to start a determination of the next select for the frame.

Figure 1B:
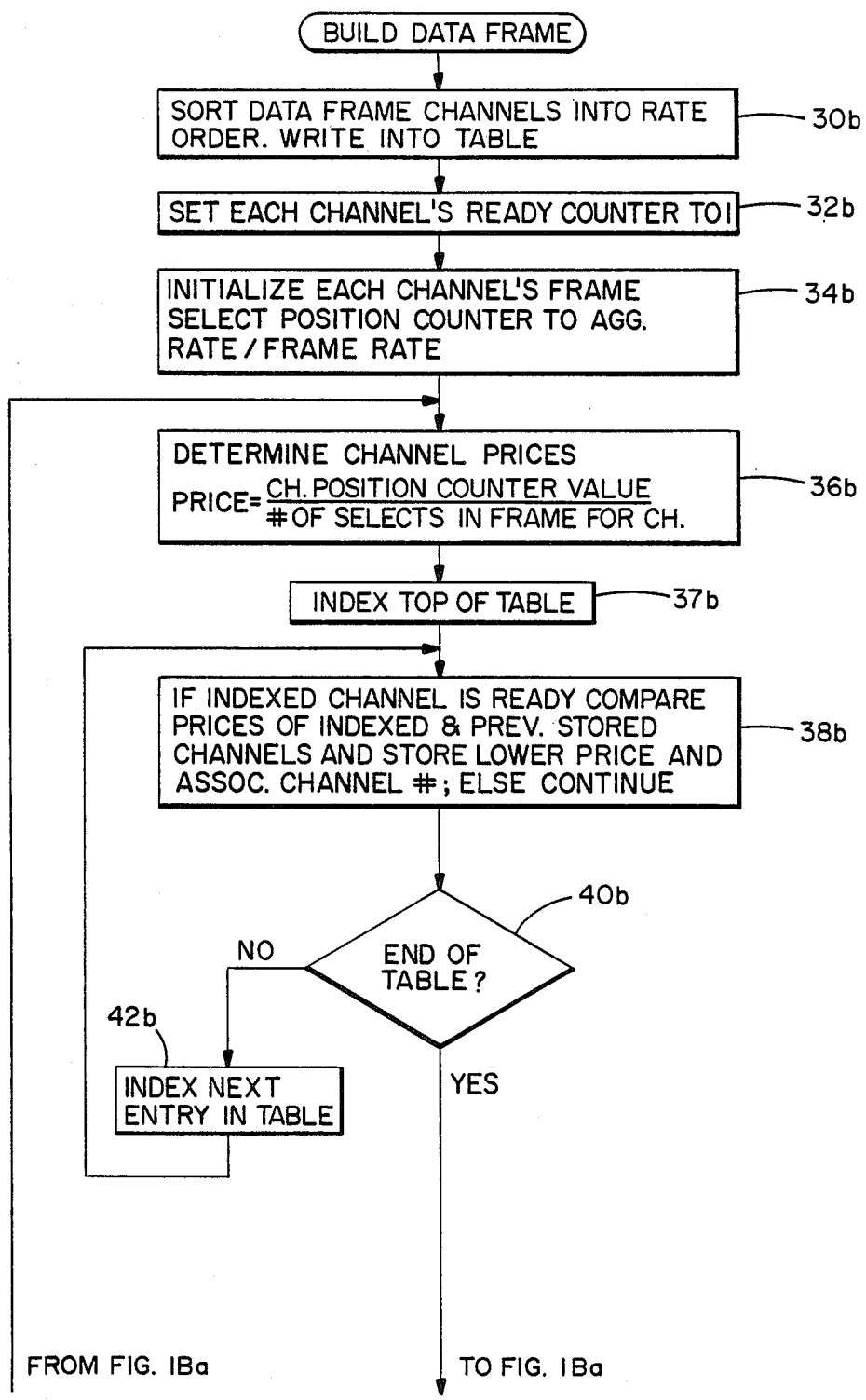
FIG. 1B (including FIG. 1Ba) is a flow chart illustrating an alternative embodiment of the method invention.

Turning to FIGS. 1B and 1Ba, a flow chart of an alternative method of generating selects for a frame is provided. At 30b the channels are ordered by rate order (as seen in FIG. 2a1), and a table is generated with the following fields: the channel number, the number of selects for the channel in the frame; the channel select position counter; the channel price; and a channel ready counter. At 32b, the channel ready counter (indicative of the availability of a channel to contribute data) of each channel is initialized to a value of one. The frame select position counter of each channel is then initialized at 34b to be equal to the number of selects in the frame. With the ready counters set and the select position counters initialized, at 36b, the prices of the channels are determined, and at 37b, the first entry in the table is indexed. At 38b the price of the indexed channel is compared to the price of the lowest price previously indexed ready channel. If the indexed channel has a lower price than the previously indexed channels which were ready (i.e. ready counter value of one), its price is stored along with an indication of channel number. Otherwise, the method continues at 40b with a determination of whether all channels have been scanned. If all channels have not been scanned, the next channel entry is indexed at 42b and if it is ready, a price comparison is made at 38b. The loop is continued until all channels have been scanned. Then, at 44b a select is chosen from the ready channel (as stored in 38b) having the lowest price (i.e. the greatest cost in terms of excursion), and the ready counter value of the selected channel is decremented. Where a plurality of channels all have the same lowest price, a select is preferably made of the channel having the highest rate. While such a constraint is not necessary to follow the invention, the result naturally follows from the preferred embodiment of steps 30b and 38b where the channels are rate ordered and where the price of a slower channel is not stored unless its price is less than that of the previously scanned ready channels.

Once a select has been made at 44b, the frame select position counters and ready counters of the channels must all be updated. Thus, starting with the highest rate channel addressed at 46b, and in a loop to be described hereinafter, the parameters of each succeeding channel are updated. At 48b, a value equal to the number of selects of the particular channel in the frame (which is equal to the channel rate divided by the frame rate), is subtracted from the frame select position counter of the particular channel. At 52b a determination is made as to whether the frame position counter is positive. If the frame position counter is positive, the program continues at step 58b, where the next channel is indexed. However, if the position counter has gone to zero or negative, the ready counter of the channel is incremented at 54b, and a value equal to the number of selects in the frame is added to the frame select position counter at 56b. Then a determination is made at 60b as to whether all channels have been updated. If not, the next entry in the table in indexed at 61b, and the program returns to step 48b for the current channel being updated. If all channels have been updated, a determination is made at 62b as to whether the frame has been completed. If so, the program ends. If not, the program continues at step 37b where the highest rate channel is indexed to start a determination of the next select for the frame.

Turning to FIGS. 2b-2m, a hypothetical frame built according to the teachings of the invention and particularly in accord with the FIG. 1B embodiment is seen. Nine channels are provided and are to be multiplexed into a frame having a total of two hundred and forty selects. As indicated, channel five is the highest rate channel and is to be selected seventy-eight times every frame, while channel four is to be selected forty-five times. Channels three, one, and two are of equal rates and are to be selected twenty-three times each, while channels six through nine are to be selected twelve times each.

Figure 2C:
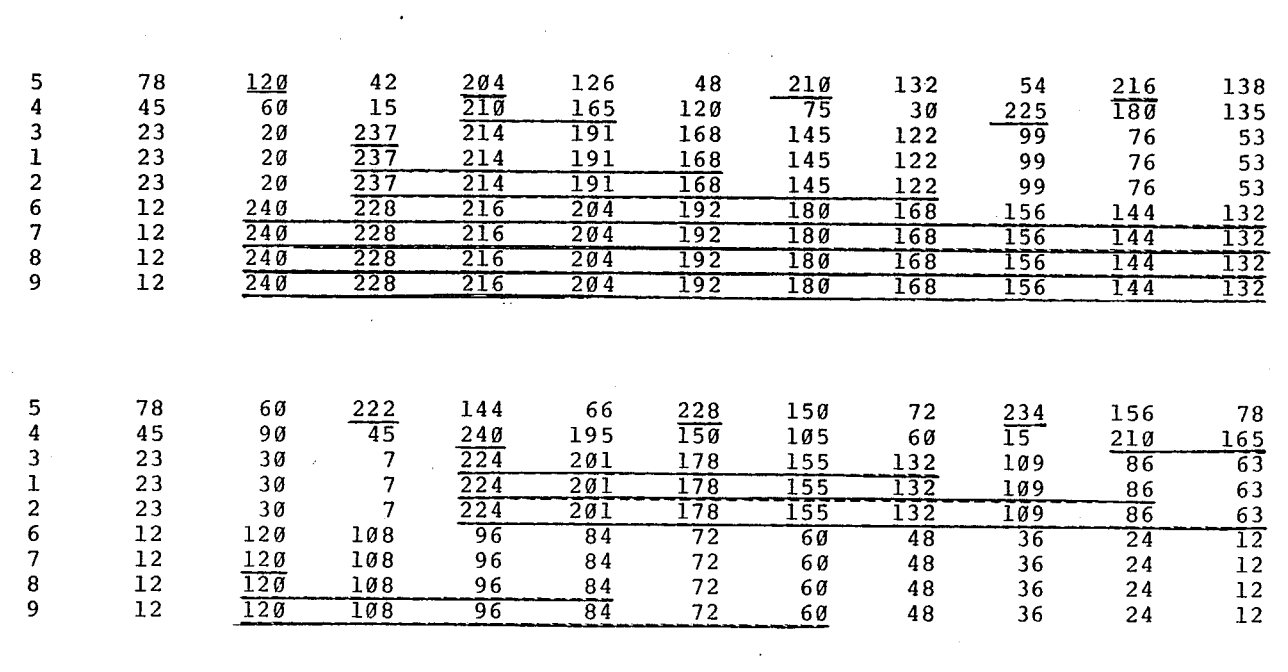
Figure 2D:
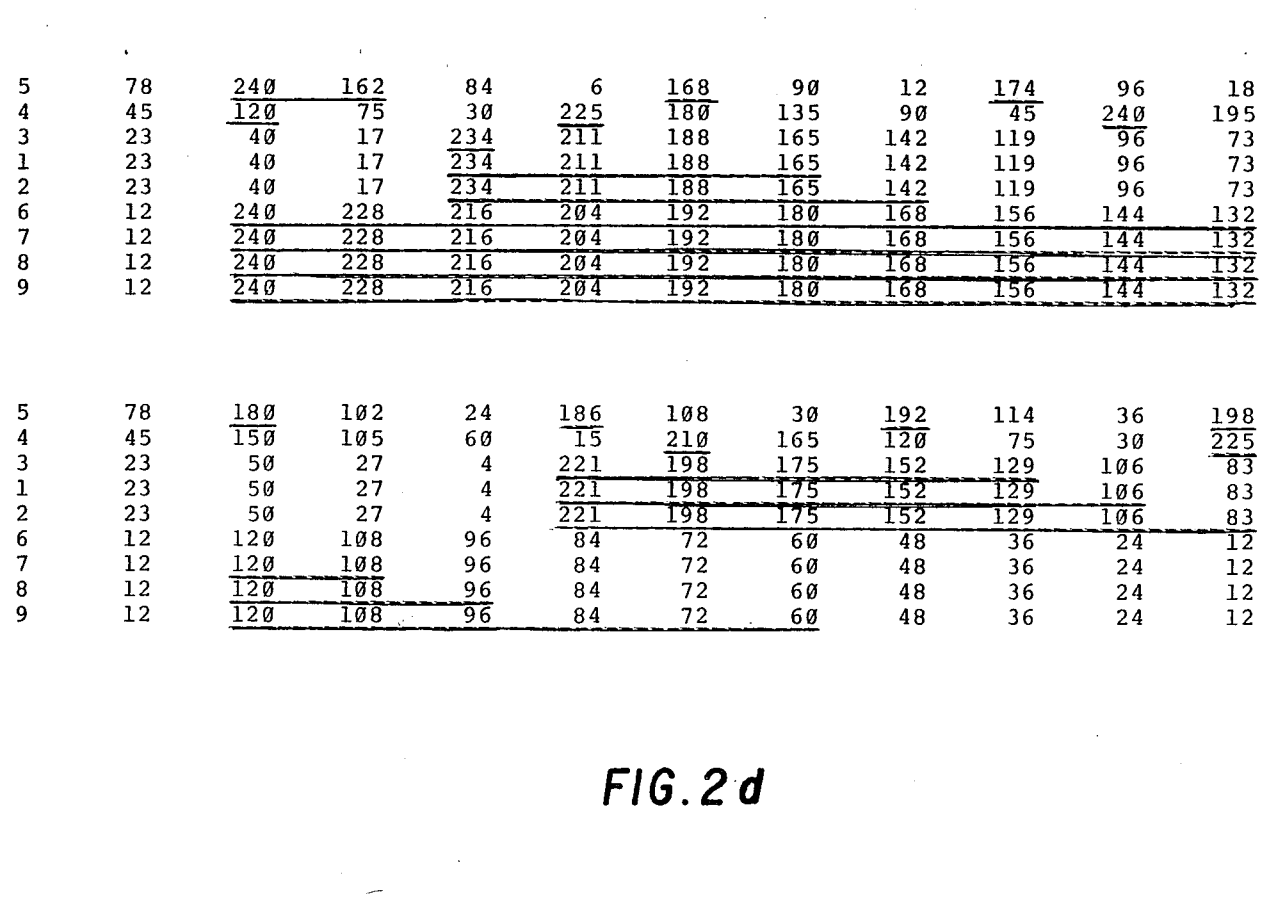
Figure 2E:
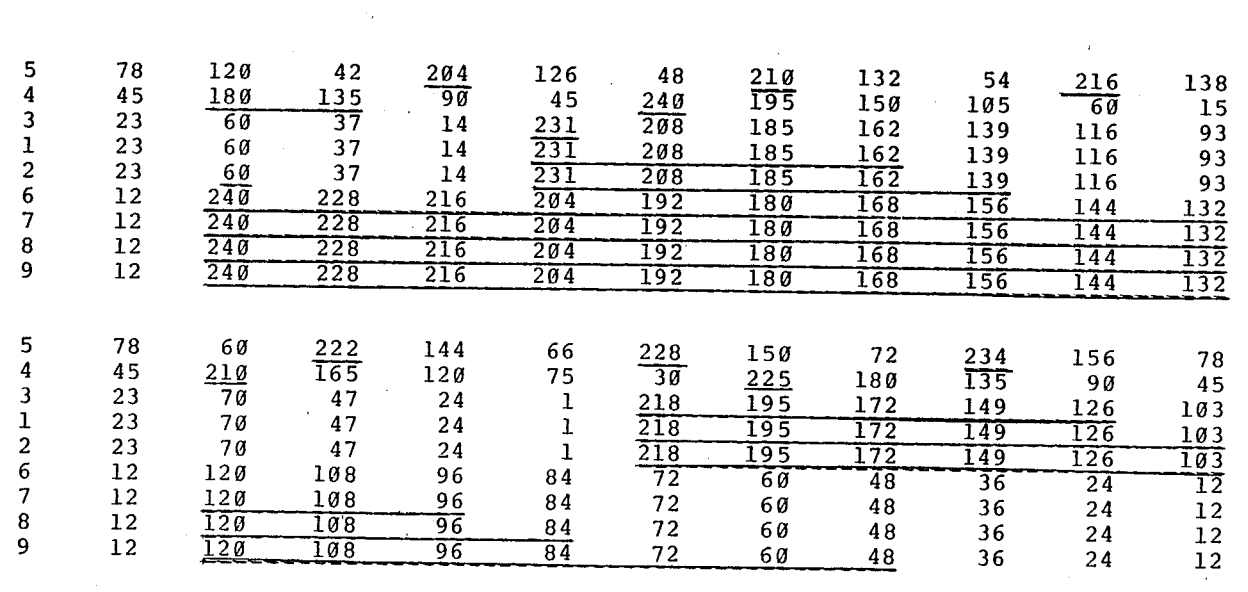
Figure 2F:
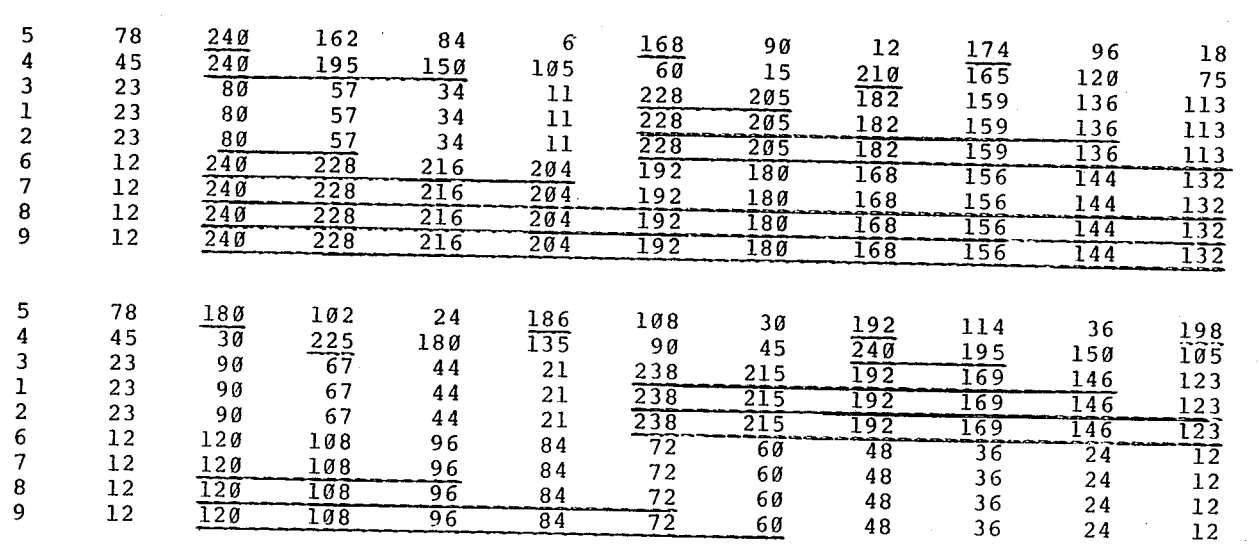
Figure 2H:
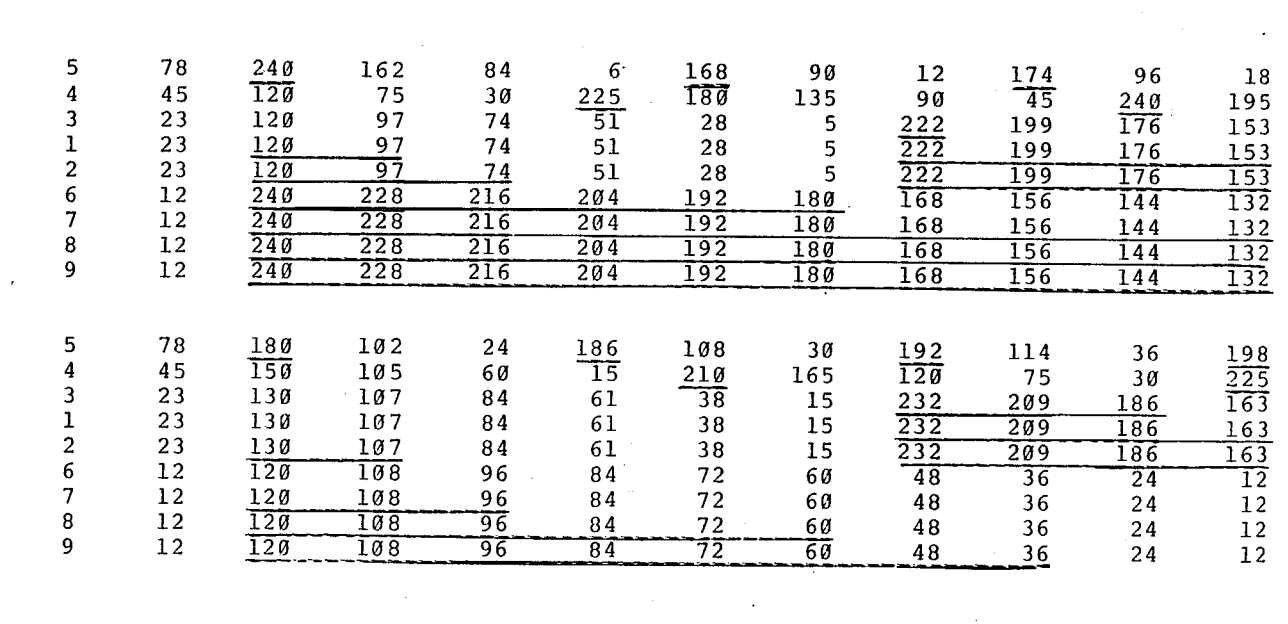
Figure 2I:
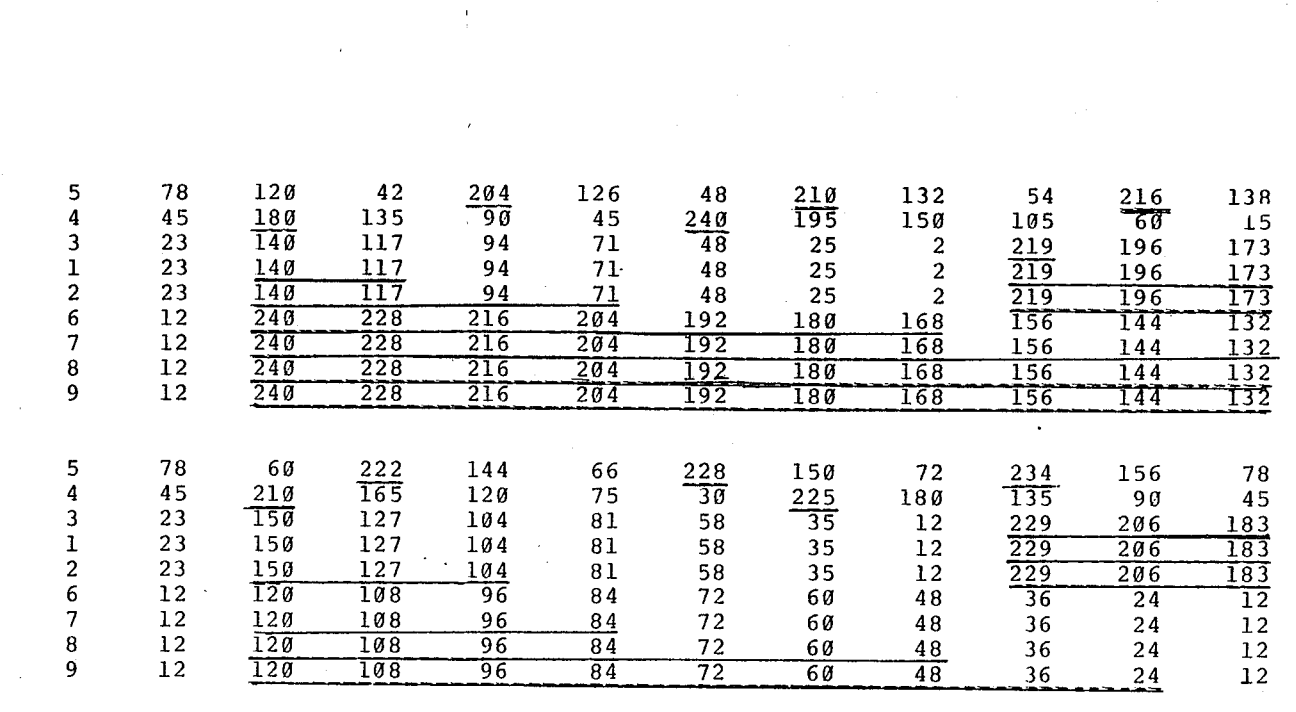
Figure 2J:
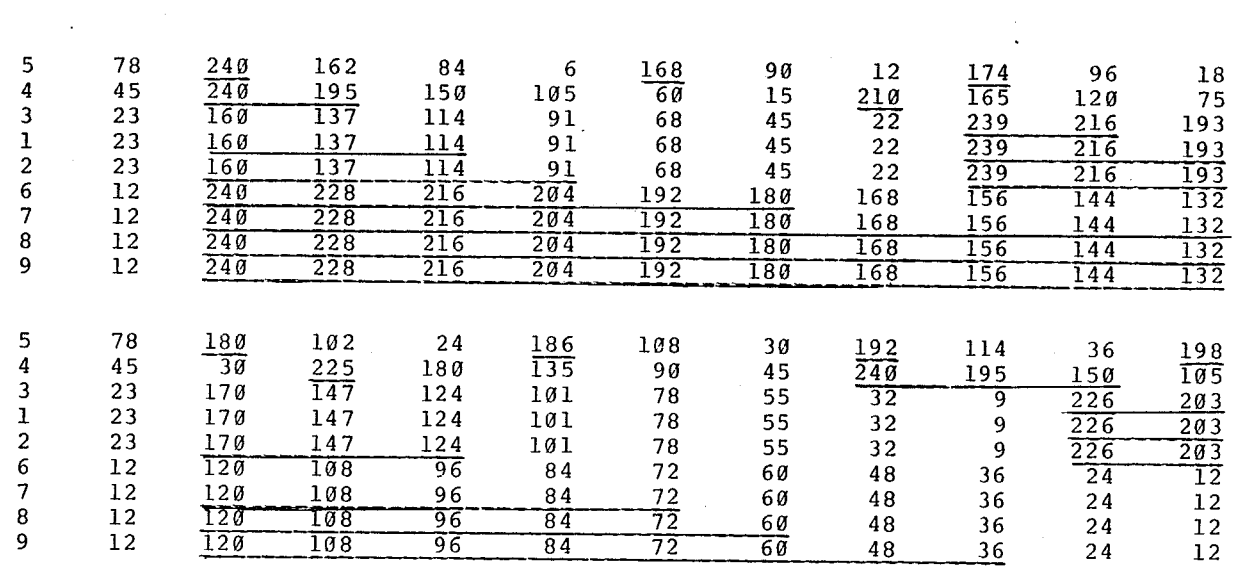
Figure 2K:
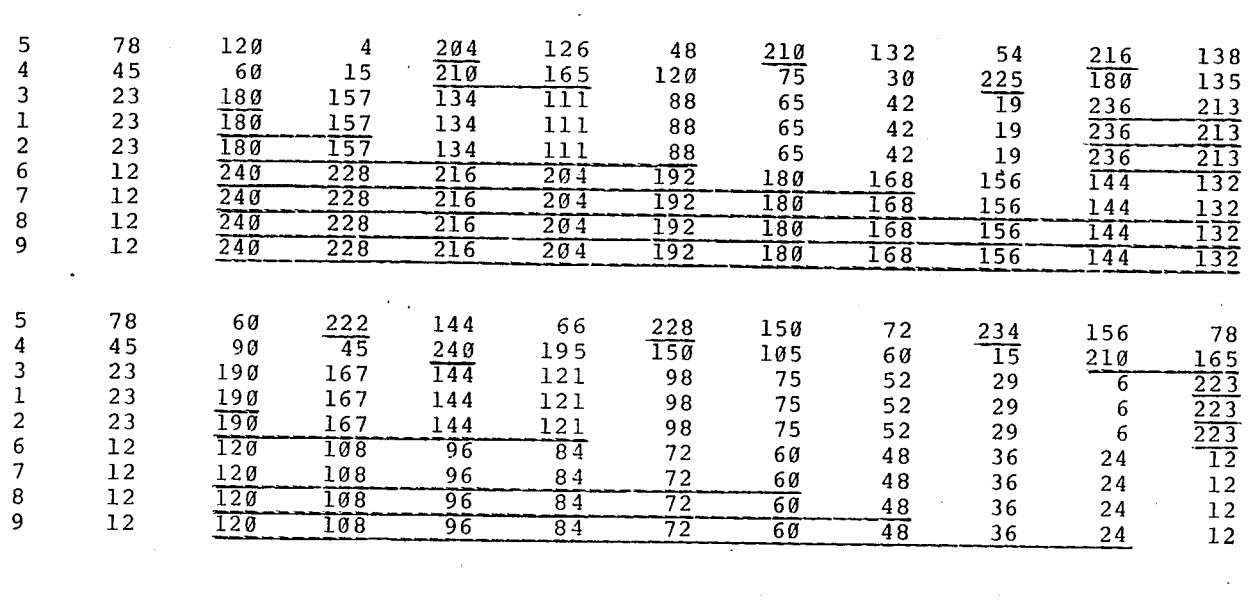
Figure 2L:
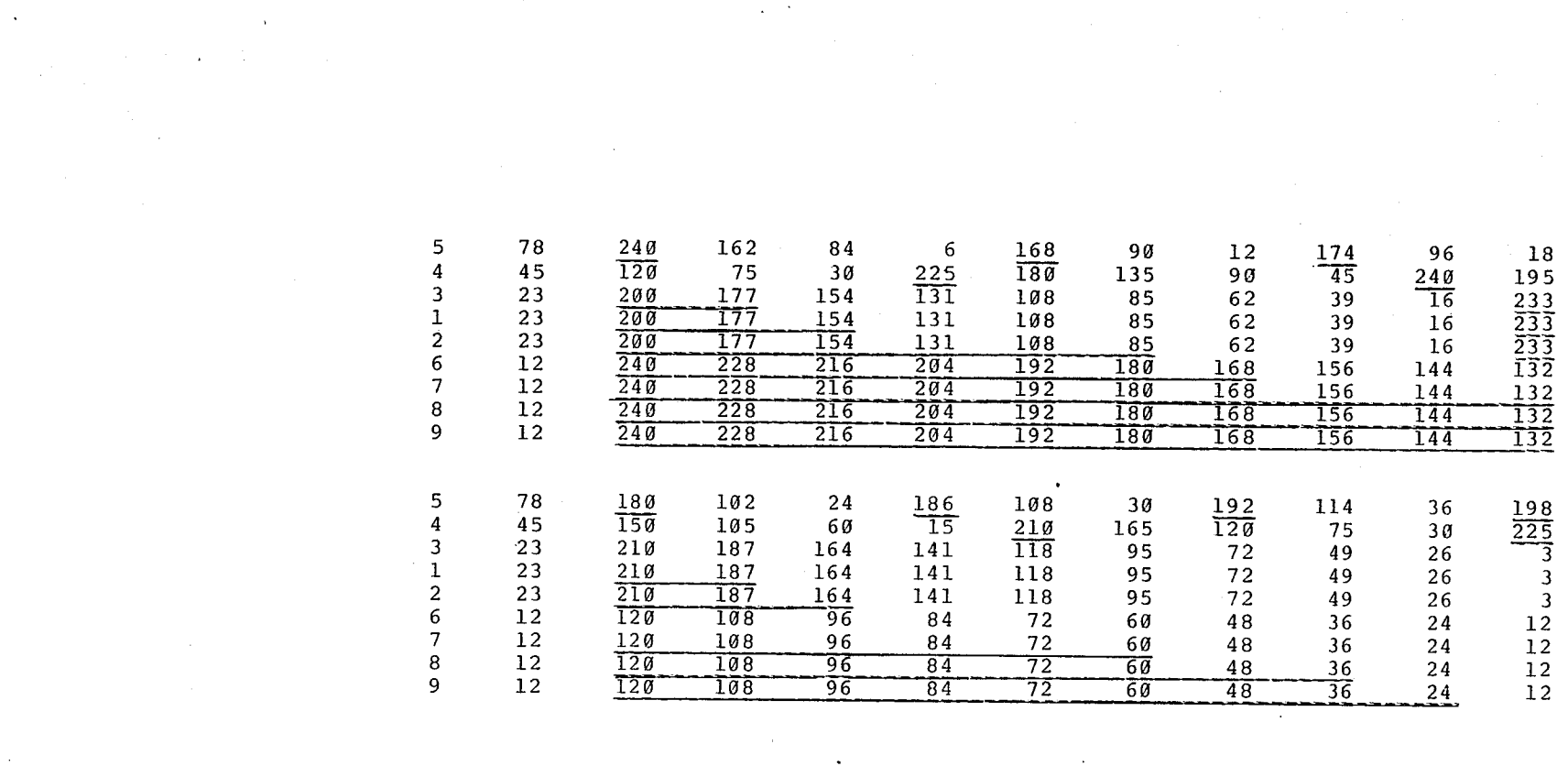
Figure 2M:
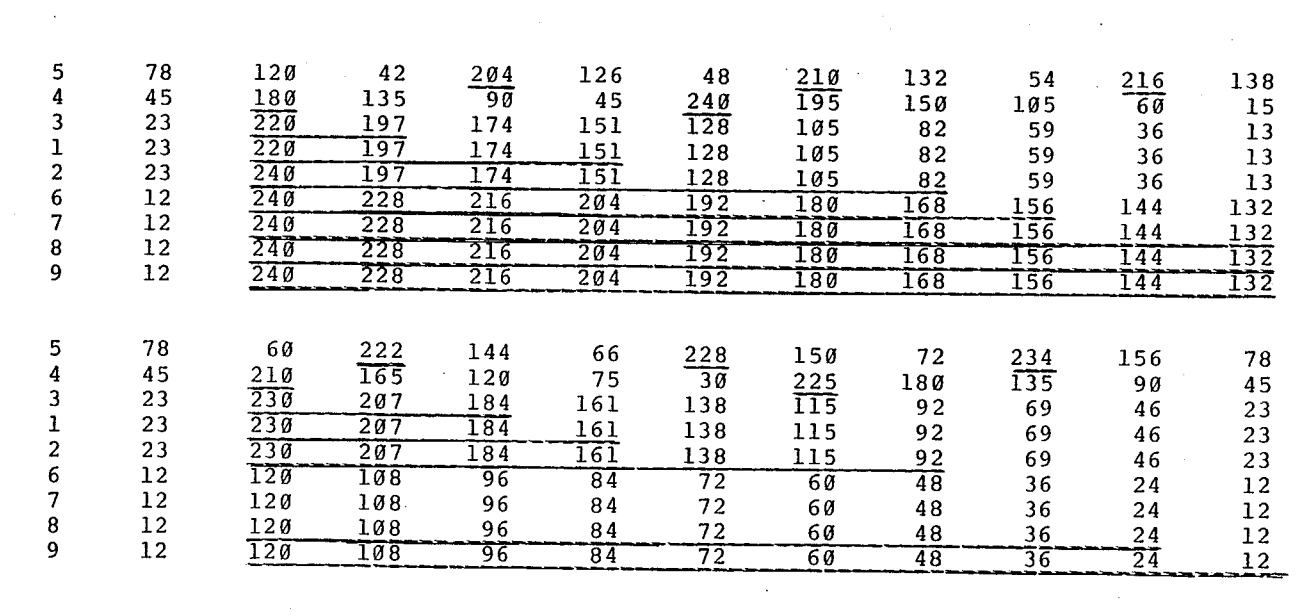
Figure 3C:
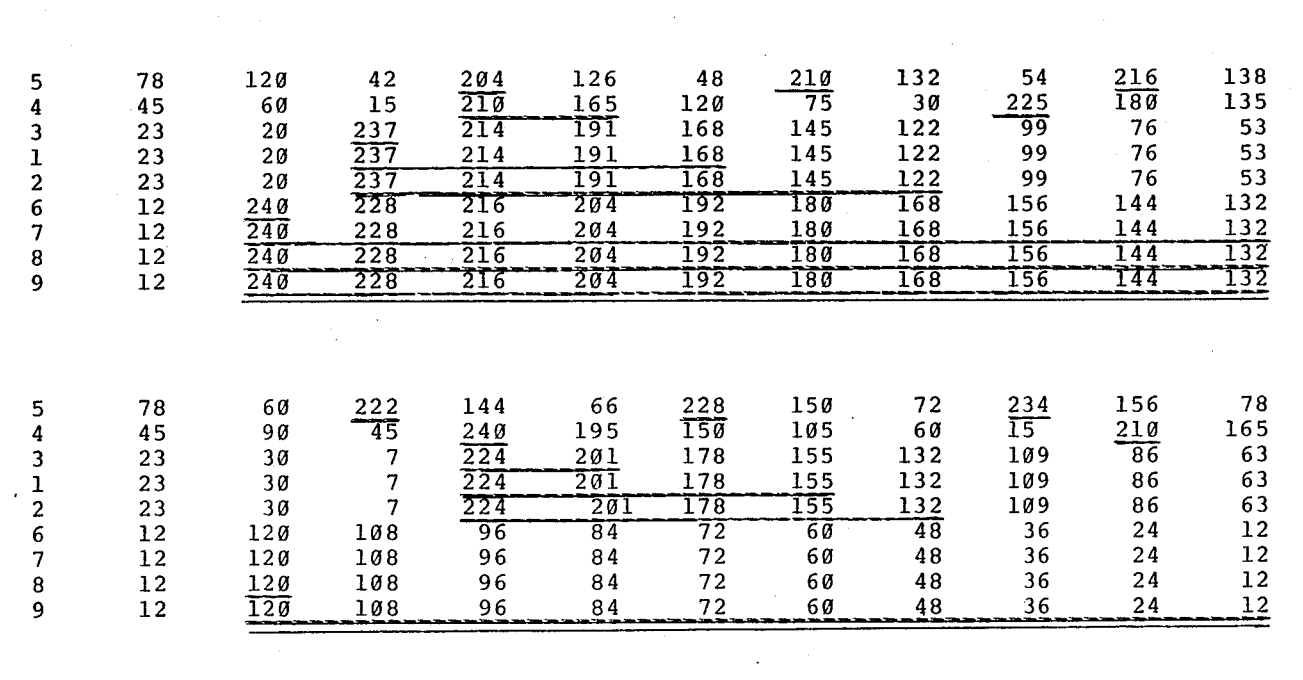
Figure 3D:
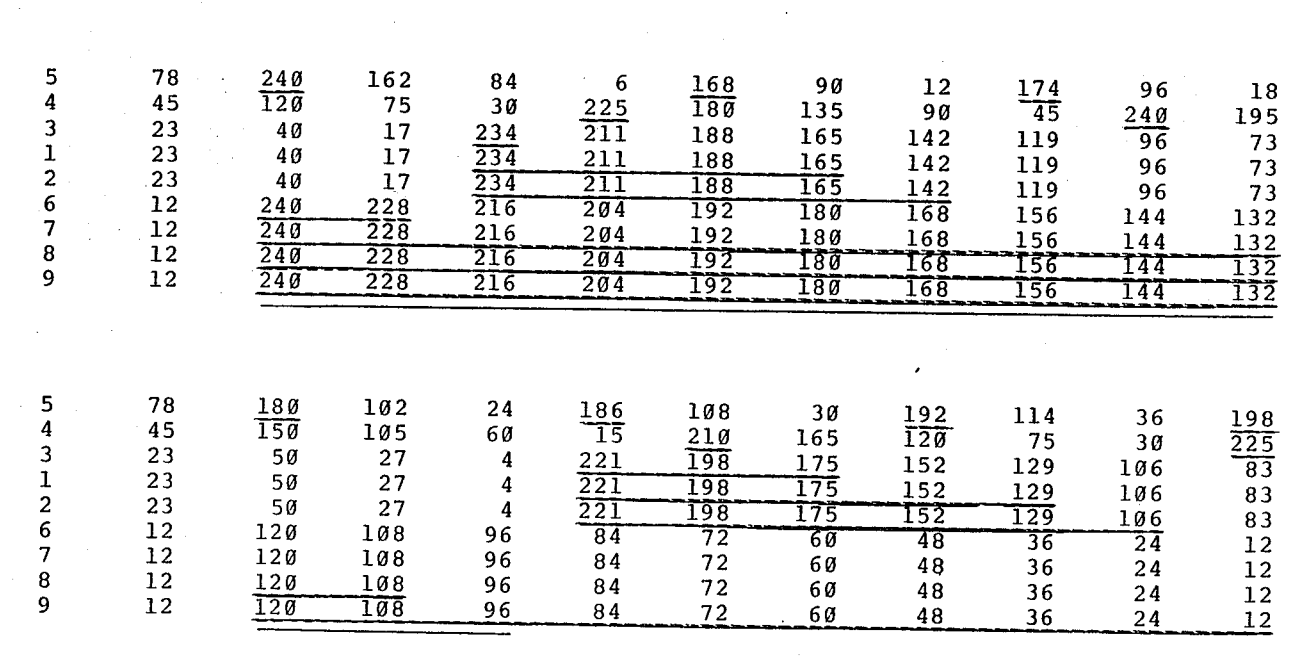
Figure 3G:
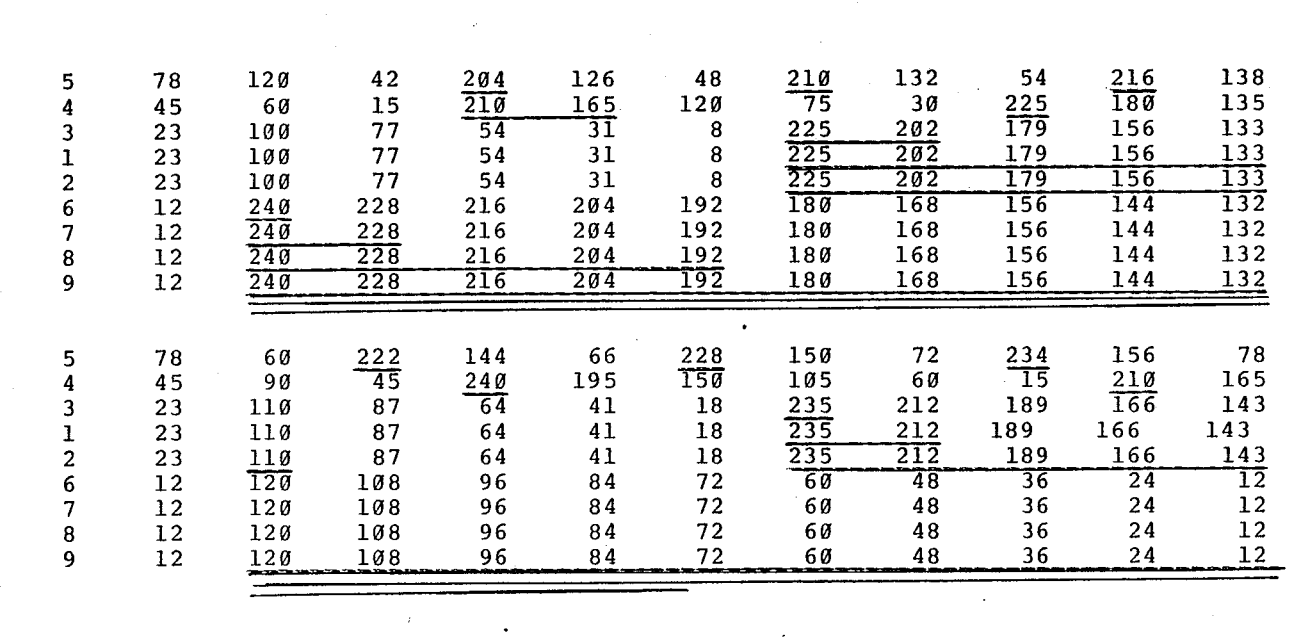
Figure 3H:
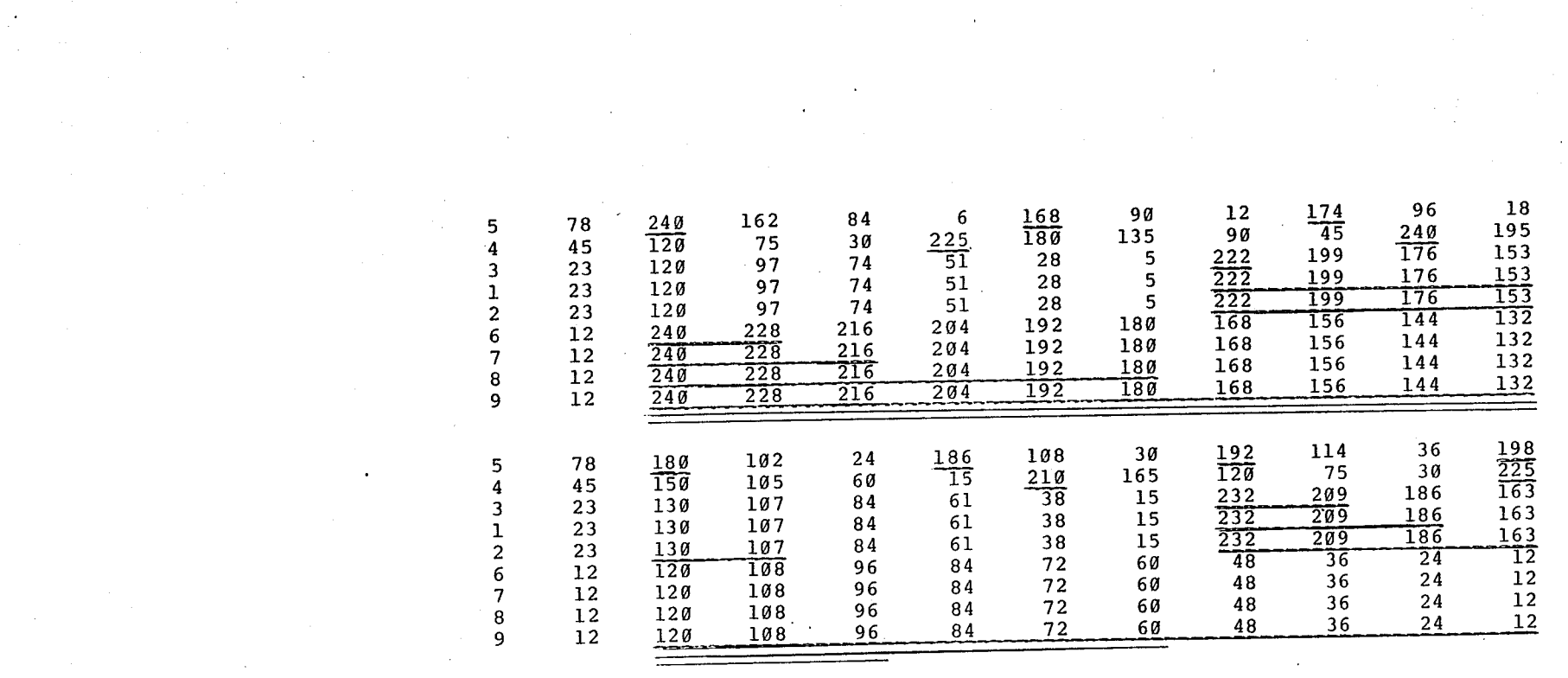
Figure 3I:
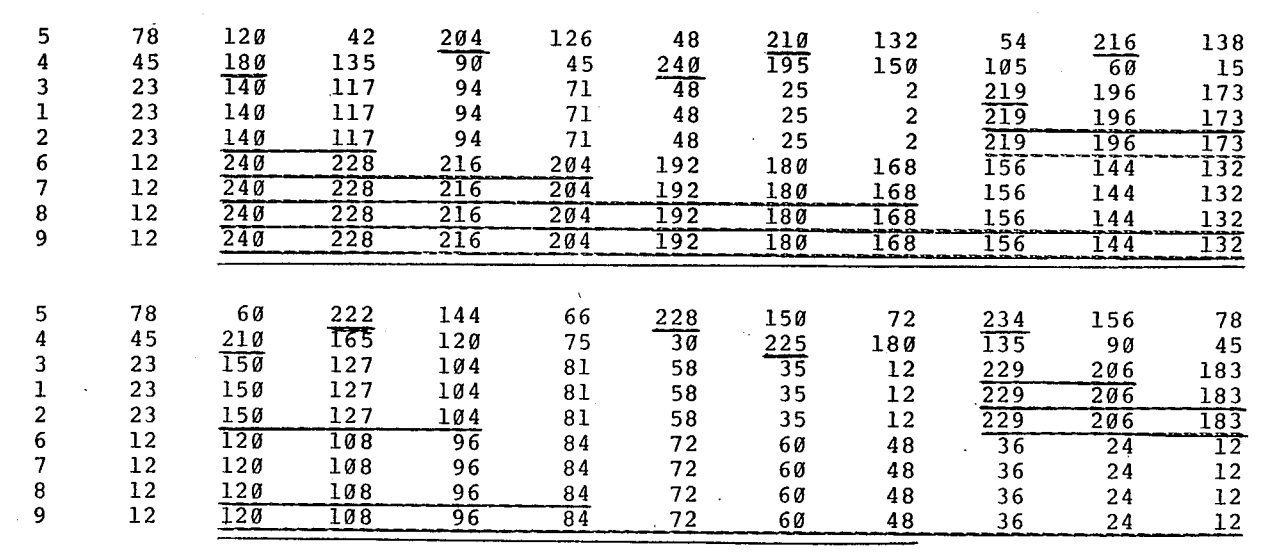
Figure 3K:
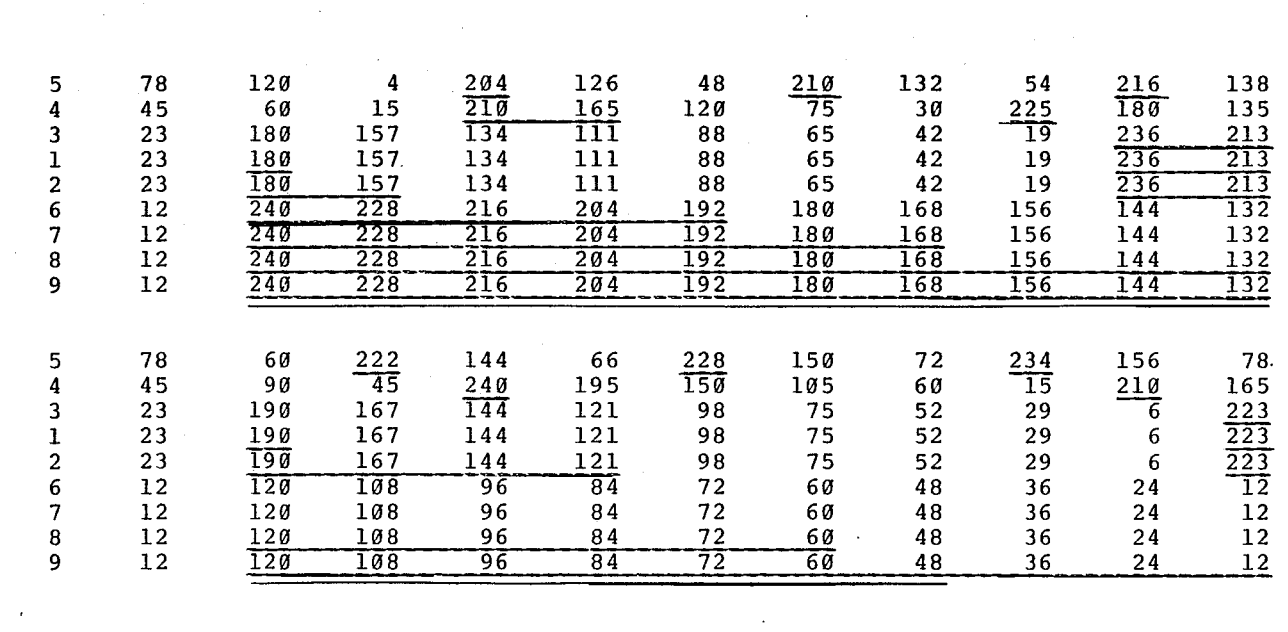
Figure 3L:
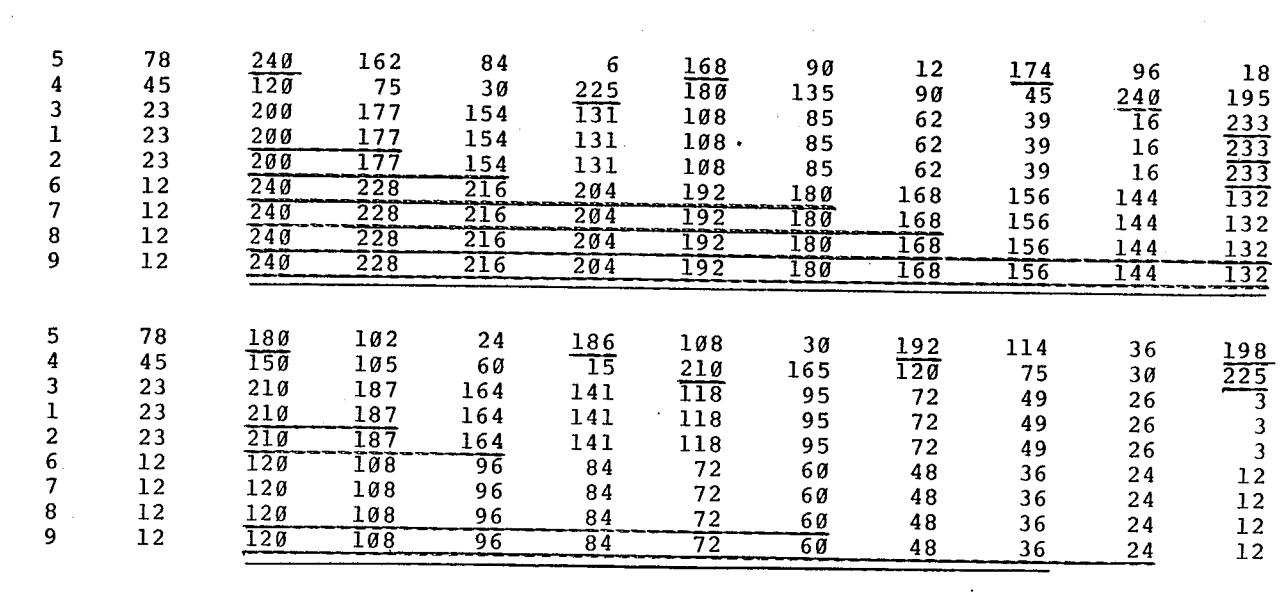
Figure 3M:
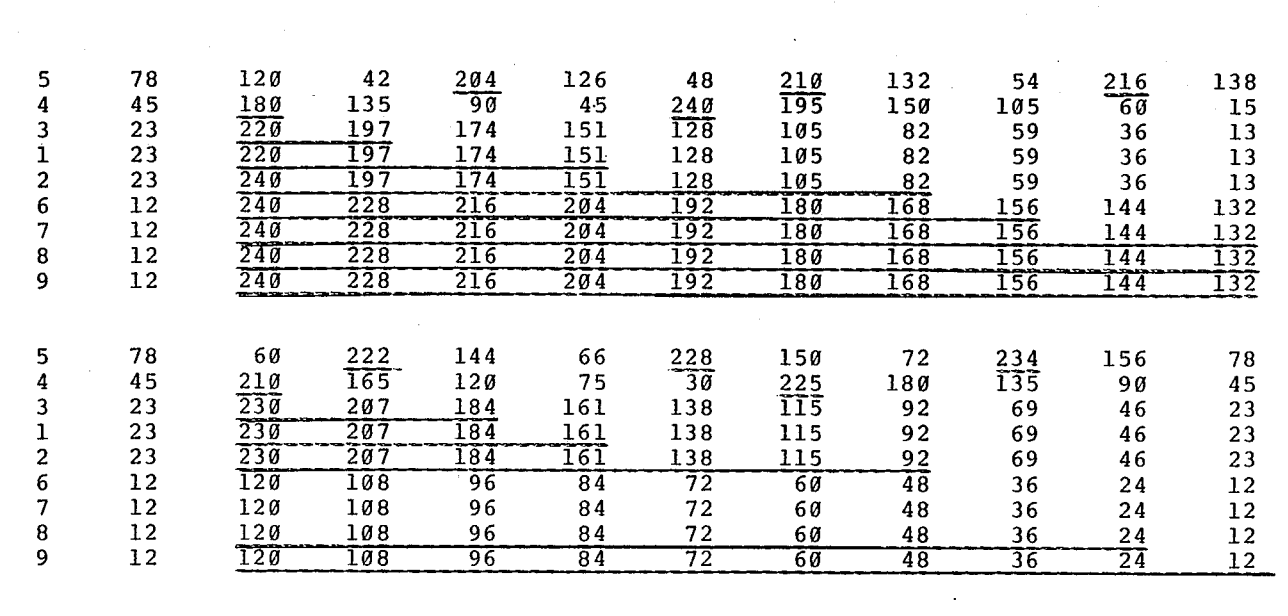

Using the excursion algorithm of FIG. 1B, selects are chosen for placement into a frame depending upon the price of the channel, and secondarily upon the channel rate. In FIGS. 2b-2m (as well as FIGS. 3b-3m), the status of a ready counter set to one is indicated by an underline of the frame select position counter value. No underline indicates that the ready counter is at zero (i.e. the channel will not be ready to contribute information), while a double or triple underline is indicative that the ready counter value is two or three and is ready to contribute two or three bits respectively (only seen in FIGS. 3b-3m). The pattern of generated selects is seen in FIG. 2a1. Visually, the generation of the selects may be seen by locating at each select position which channel has an underlined position counter value at that position but no underline at the next position (or double underlined at the select position and single underlined at the next position for FIGS. 3). Of course, the exception to this rule is where a select is made of a channel, and immediately following the select the ready counter of that channel is increased due to the position counter having goe to zero.

Starting at the top of FIG. 2b, and following the first ten selects horizontally, the method outlined in FIG. 1 provides selects of the following channels in the following order: 5, 4, 3, 1, 5, 2, 4, 5, 6, 7. Continuing through the next ten selects, it will be seen that despite channels three, one and two being ready at the thirteenth select, channel eight is chosen because its price is eight (96/12) while the price of channels one, two, and three is almost ten (227/23). Similarly, at the fifteenth select, channel nine is chosen because it has a lower price than the other ready channels. At the eighteenth select, channel one with a price of a little less than four (89/23) is chosen over channel four having a price of four and one-third (195/45), while at the twentieth select, channel four is chosen with a price of two and one-third (105/45) over channel five having a price of a little more than two and one-half (198/78).

Scanning through FIGS. 2b-2m, it can be seen that the ready counter of any channel is limited to a value of at most one (i.e. no excursion) as the provided technique successfully minimizes excursion. Indeed, it is believed that regardless of the number and relative rates of the chosen channels, the provided technique always minimizes excursion.

Turning to FIGS. 3b-3m, the status of the ready counters for the same nine channels used in FIGS. 2 (compare FIGS. 2a2 and 3a2) is shown where the framing method of U.S. Pat. No. 4,727,536 is utilized. As indicated, only channel nine ever has a ready counter exceeding a value of one. However, channel nine carries a one bit excursion from selects twenty-one through forty (See FIG. 3c), forty-one through fifty-three (See FIG. 3d), sixty-one through seventy-four (See FIG. 3e), and eighty-one through one hundred (See FIG. 3f), a two bit excursion from selects one hundred-one through one hundred fourteen, a one bit excursion from selects one hundred fifteen through one hundred twenty (See FIG. 3g), a two bit excursion from selects one hudnred twenty-one through one hundred thirty-three, a one bit excursion from selects one hundred thirty-four through one hundred thirty-six (See FIG. 3h), one hundred forty-one through one hundred fifty-seven (See FIG. 3i), one hundred sixty-one through hundred seventy-five (See FIG. 3j), one hundred eighty-one through one hundred ninety-seven (See FIG. 3k), and two hundred-one through two hundred eighteen (See FIG. 3l).

In comparing the selects of the instant invention as shown in FIGS. 2b-2m to the selects of the art as shown in FIGS. 3b-3m, it becomes clear that the provided method of the instant invention limits the excursion seen by the channels. Indeed, where many more channels are to be multiplexed with larger frames, it is not uncommon in the art to have excursions of four, five, or even more bits. However, with the instant invention, the channel excursions never even reach one bit. This is so, because by structuring the algorithm to select the channel having the lowest price (highest cost), without any other constraints, the excursion is minimized.

There has been described and illustrated herein a method for choosing channel selects for a frame of a multiplexer. While particular embodiments of the invention have been described, it is not intended that the invention be limited thereby, as it is intended that the invention be broad in scope and that the specifications be read likewise. Thus, while one embodiment of the preferred invention was described with channel ready counters which are incremented as the excursion increases, those skilled in the art will appreciate that the ready counters could be arranged to decrement when excursion increases. Or, because the value of the ready counter is always zero or one, a one bit indicator can be used to indicate the readiness of the channel. Similarly, while the preferred embodiment described channel select position counters which are decremented after each select and incremented upon their values reaching zero, the position counters can be incremented after each select and decremented after reaching a threshold relating to the number of selects in the frame. In fact, instead of using a position counter and then dividing the position counter by the number of selects for the particular channel in the frame, a "price indicator" can be used which combines the two functions. What is critical is that the price of each channel be updated after each select in a manner relating to their relative channel rates, such that the lowest priced ready ready channel may be selected.

Those skilled in the art will also understand that the "price" of a channel is inversely related to the "cost" of the channel such that the lowest priced channel is the highest cost channel. Thus, a determination of highest cost is completely equivalent to a determination of lowest price, and the two should be considered one and the same. Further, while the invention was described in terms of bit multiplexing, it will be appreciated that the provided algorithm is appropriate to byte multiplexing. In fact, the advantage of the invention is greater where bytes are multiplexed due to the relatively larger buffer size for bytes as opposed to bits. Finally, those skilled in the art should appreciate that the terminology used in describing the invention (e.g. "channels", "selects", "counters", "frame", "price", "cost", etc.) is intended to be broad and non-limiting so as to encompass what is readily understood by those skilled in the art. Therefore, it will be apparent to those skilled in the art that other changes and modifications may be made to the invention as described in the specificaion without departing from the spirit and scope of the invention as so claimed.

I claim:

1. A method for ordering selects for a plurality of channels into a multiplexer frame, comprising:
   (a) providing a channel select position counter for each of said plurality of channels;
   (b) initializing said channel select position counters to a value corresponding to the total number of selects in said frame;
   (c) choosing a select of a ready channel at least based on respective prices of said channels, wherein a channel is deemed a ready channel according to a comparison of the value of its channel select position counter to said value corresponding to the total number of selects in said frame, and wherein a channel having a relatively lower price is always chosen over a channel having a relatively larger price, and the price of a channel corresponds to a value of the position counter of that channel divided by a value corresponding to the number of selects of that channel in the frame;
   (d) changing the position counter of a selected channel by said value corresponding to the total number of selects in said frame;
   (e) changing the position counter of each channel, including said selected channel by a value corresponding to the number of selects in said frame for that particular channel; and
   (f) repeating steps (c)–(e) until said frame is substantially filled with selects.

2. A method according to claim 1, wherein:
said changing the position counters of step (e) comprises decrementing the position counters, and
said changing the position counter of step (d) comprises incrementing the position counters.

3. A method according to claim 2, wherein:
said position counters are initialized to and incremented by a value equal to the total number of selects in said frame,
said position counters are decremented by a value equaling the number of selects in said frame for that channel, and
a channel is deemed ready when its position counter has a value which equals or is less than said total number of selects in said frame.

4. A method according to claim 3, further comprising:
ordering said channels by channel rate, wherein
said choosing a select of a channel of step (d) is further based on said channel rate, such that where a plurality of channels have identical lowest prices, a select is chosen from the channel among those plurality having the highest channel rate.

5. A method for ordering selects for a plurality of channels into a multiplexer frame, comprising:
   (a) providing a channel price indicator for each of said plurality of channels;
   (b) initializing said channel price indicator for each particular channel to a value corresponding to the total number of selects in said frame divided by the number of selects for the particular channel;
   (c) choosing a select of a ready channel at least based on respective indicated prices of said channels, wherein a particular channel is deemed a ready channel according to a comparison of the value of its channel price indicator to the initial value of its channel price indicator, wherein a channel having a relatively lower price is always chosen over a channel having a relatively larger price;
   (d) changing said channel price indicator of a selected channel by said value corresponding to the total number of selects in said frame divided by the number of selects for the particular channel;
   (e) changing the respective channel price indicators of each channel, including said selected channel, by a value corresponding to unity; and
   (f) repeating steps (c)–(e) until said frame is substantially filled with selects.

6. A method according to claim 5, wherein:
said changing the respective channel price indicators of step (e) comprises decrementing the channel price indicators, and
said changing the respective channel price indicators of step (d) comprises incrementing the channel price indicators.

7. A method according to claim 5, wherein:
said channel price indicators are initialized to and incremented by a value equal to the number of selects in said frame divided by the respective number of selects of the respective channel in said frame, and
said position counters are decremented by a value of one.

8. A method according to claim 7, further comprising:
ordering said channels by channel rate, wherein
said choosing a select of a channel of step (d) is further based on said channel rate, such that where a plurality of channels have identical lowest prices, a select is chosen from the channel among those plurality having the highest channel rate.

9. A method for ordering selects for a plurality of channels into a multiplexer frame, comprising:
  (a) providing a channel ready indicator and a channel select position counter for each of said plurality of channels;
  (b) initializing said channel ready indicator;
  (c) initializing said channel select position counters to a value corresponding to the total number of selects in said frame;
  (d) choosing a select of a channel at least based on respective prices of ready channels as indicated by said channel ready indicators, wherein a channel having a relatively lower price is always chosen over a channel having a relatively larger price, and the price of a channel corresponds to a value of the position counter of that channel divided by a value corresponding to the number of selects of that channel in the frame;
  (e) changing the indication of the channel ready indicator to indicate channel unreadiness of said channel selected at step (d);
  (f) changing the position counter of each channel by a value corresponding to the number of selects in said frame for that channel;
  (g) changing the position counter of a channel by said value corresponding to the total number of selects in said frame when said position counter for that channel reaches or passes through a predetermined value threshold;
  (h) changing the indication of said channel ready indicator to indicate channel readiness when said channel position counter for that channel reaches or passes through said predetermined value threshold; and
  (i) repeating steps (d)–(h) until said frame is substantially filled with selects.

10. A method according to claim 9, wherein:
said changing the position counters of step (f) comprises decrementing the position counters, and
said changing the position counters of step (g) comprises incrementing the position counters.

11. A method according to claim 10, wherein:
said position counters are initialized to a value equal to the number of selects in said frame,
said position counters are decremented by a value equaling the number of selects in said frame for that channel, and
said predetermined value threshold is zero.

12. A method according to claim 9, wherein:
said changing the indication of channel ready indicators of step (e) comprises incrementing the ready indicators, and
said changing the value of the channel ready indicators of step (h) comprises decrementing the ready indicators.

13. A method according to claim 12, wherein:
said channel ready indicators are intialized to a value of one, and
said incrementing and decrementing said channel ready indicators is incrementing and decrementing by a value of one.

14. A method according to claim 11, wherein:
said changing the value of channel ready indicators of step (e) comprises incrementing the ready indicators, and
said changing the value of the channel ready indicators of step (h) comprises decrementing the ready indicators.

15. A method according to claim 14, wherein:
said channel ready indicators are initialized to a value of one, and
said incrementing and decrementing said channel ready indicators is incrementing and decrementing by a value of one.

16. A method according to claim 9, further comprising:
ordering said channels by channel rate, wherein
said choosing a select of a channel of step (d) is further based on said channel rate, such that where a plurality of channels have identical lowest prices, a select is chosen from the channel among those plurality having the highest channel rate.

17. A method according to claim 15, further comprising:
ordering said channels by channel rate, wherein
said choosing a select of a channel of step (d) is further based on said channel rate, such that where a plurality of channels have identical lowest prices, a select is chosen from the channel among those plurality having the highest channel rate.

18. A method for ordering selects for a plurality of channels into a multiplexer frame, comprising:
  (a) providing a channel ready indicator and a channel price indicator for each of said plurality of channels;
  (b) initializing said channel ready indicators;
  (c) initializing said channel price indicator for each particular channel to a value corresponding to the total number of selects in said frame divided by the number of selects for the particular channel;
  (d) choosing a select of a channel at least based on channel prices of ready channels as indicated by said channel price indicators and said channel ready indicators, wherein a channel having a relatively lower price is always chosen over a channel having a relatively larger price;
  (e) changing the indication of the channel ready indicator to indicate channel unreadiness of said channel selected at step (d);
  (f) changing the channel price indicator of each channel by a value corresponding to unity;
  (g) changing the channel price indicator of a channel by said value corresponding to the total number of selects in said frame divided by the number of selects for the particular channel when said channel price indicator for that channel reaches or passes through a predetermined value threshold;
  (h) changing the indication of said channel ready indicator to indicate channel readiness when said channel price indicator for that channel reaches or passes through said predetermined value threshold; and
  (i) repeating steps (d)–(h) until said frame is substantially filled with selects.

19. A method according to claim 18, wherein:
said changing the channel price indicator of step (f) comprises decrementing the channel price indicator by one, and
said changing the channel price indictor of step (g) comprises incrementing the channel price indicator by the number to which it was initialized, and
said predetermined value threshold is zero.

20. A method according to claim 19, wherein:
said changing the indication of channel ready indicators of step (e) comprises incrementing the ready indicators by one, and
said changing the value of the channel ready indicators of step (h) comprises decrementing the ready indicators by one.

* * * * *